May 14, 1968 T. A. PATCHELL 3,383,501

ARITHMETIC CIRCUIT FOR MULTIPLYING AND DIVIDING

Filed Oct. 27, 1964 3 Sheets-Sheet 1

INVENTOR.
Thomas A. Patchell
BY Arthur H. Swanson

May 14, 1968 T. A. PATCHELL 3,383,501

ARITHMETIC CIRCUIT FOR MULTIPLYING AND DIVIDING

Filed Oct. 27, 1964 3 Sheets-Sheet 2

INVENTOR.
Thomas A. Patchell
BY Arthur H. Swanson

ARITHMETIC CIRCUIT FOR MULTIPLYING AND DIVIDING

Filed Oct. 27, 1964 3 Sheets-Sheet 3

INVENTOR.
Thomas A. Patchell
BY
Arthur H. Swanson

United States Patent Office 3,383,501

Patented May 14, 1968

3,383,501

ARITHMETIC CIRCUIT FOR MULTIPLYING AND DIVIDING

Thomas A. Patchell, Havertown, Pa., assignor to Honeywell Inc., a corporation of Delaware Filed Oct. 27, 1964, Ser. No. 406,675

7 Claims. (Cl. 235—195)

ABSTRACT OF THE DISCLOSURE

An arithmetic circuit including multiplier and divider functions is provided. Integrator circuits operate on input signals until a signal is produced by one integrator to effect the transfer of the signal generated by another integrator to a storage means.

The present invention relates to analog computers. More specifically, the present invention relates to analog multiplying and dividing apparatus.

An object of the present invention is to provide an improved analog multiplier and divider.

Another object of the present invention is to provide an impoved analog computing apparatus having a capability for simultaneously performing a multiplying and dividing operation upon analog input signals.

A further object of the present invention is to provide an improved analog multiplying and dividing apparatus for two quadrant operation.

A still further object of the present invention is to provide an improved analog multiplying and dividing apparatus having a simple operation and construction.

In accomplishing these and other objects, there has been provided, in accordance with the present invention, an analog multiplier and divider computing circuit having a first integrator for integrating a first input signal and a second integrator for integrating a second input signal. The integrators are operated during a preset integration interval. The output signal from the first integrator is compared with a third input signal by a signal comparator. Upon the detection of an equality in the magnitudes of the compared signals, the comparator is arranged to effect a sampling of the instantaneous amplitude of the output signal from the second integrator for storage by a signal holding means as an analog output signal from the computer.

A better understanding of the present invention may be had when the following detailed description is read in connection with the accompanying drawings, in which.

Figure 1:
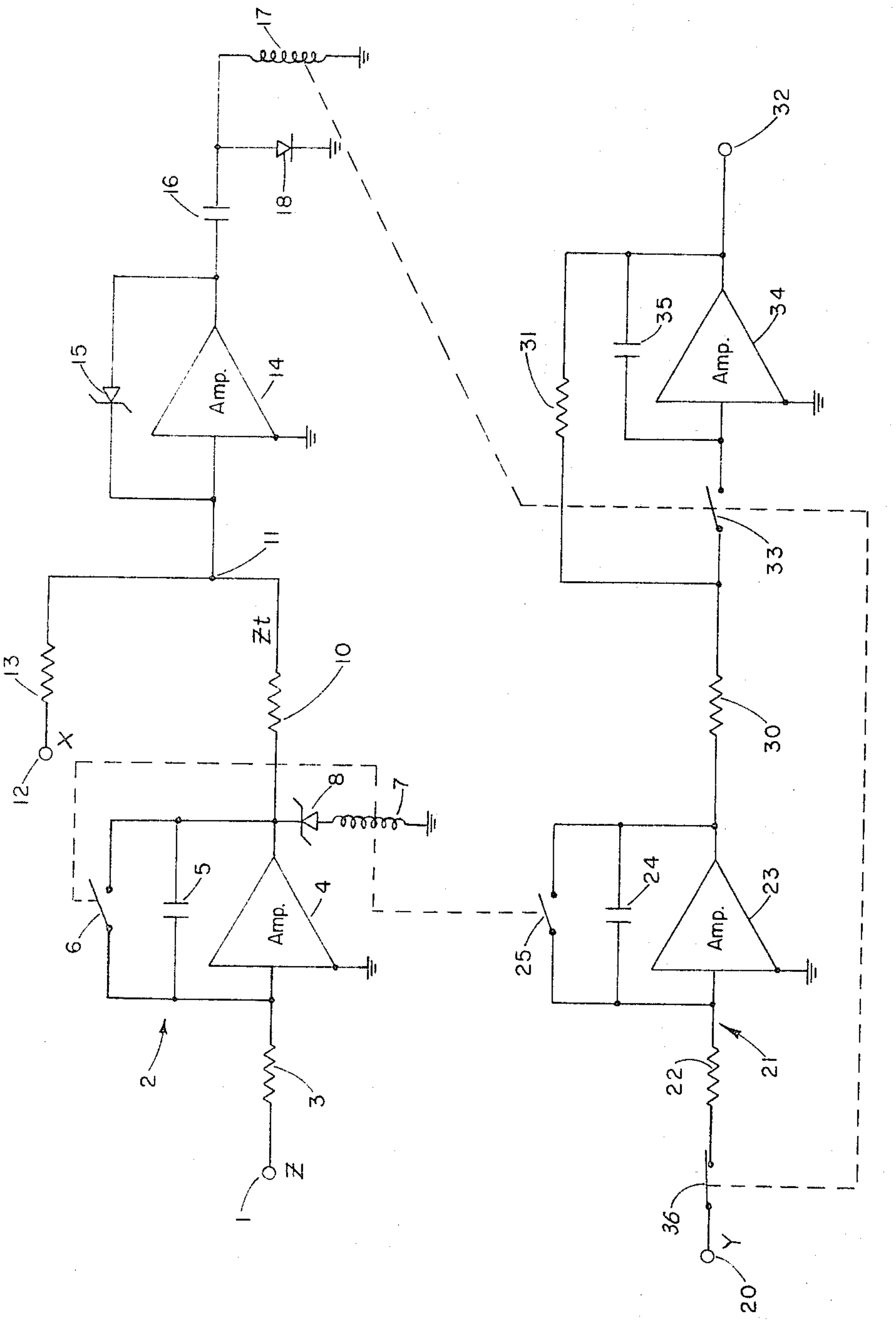
FIG. 1 is a schematic illustration of a circuit embodying the present invention.

Referring to FIG. 1, in more detail, there is shown an embodiment of the present invention having a first input terminal 1 arranged to apply an input signal to a first integrator circuit 2. The integrator 2 has an input resistor 3, an amplifier 4, and a feedback capacitor 5 arranged in a conventional integrator circuit. A shorting switch 6 is provided across the capacitor 5 to discharge the capacitor 5 after an integrating operation. The switch 6 is operated by a relay coil 7 connected to the output of the amplifier 4 through a Zener diode 8.

The output signal from the amplifier 4 is also connected through an output resistor 10 to a summing junction 11. A second input terminal 12 is also connected by an input resistor 13 to the junction 11. The output signal from the junction 11 is applied as an input signal to an amplifier 14 having a Zener diode 15 connected in an amplifier feedback circuit. The output signal from the amplifier 14 is connected through a capacitor 16 to a relay coil 17. The coil 17 is arranged to operate a switch contact as hereinafter described. A diode 18 is connected across coil 17 to discharge capacitor 16 and prevent operation of coil 17 during a recycle operation.

A third input terminal 20 is arranged to apply an input signal to a second integrating circuit 21. The second integrator 21 includes an input resistor 22, an amplifier 23, and a feedback capacitor 24 for the amplifier 23. A shorting switch 25 is arranged to be operated by the relay coil 7 in association with the switch 6. The output signal from the integrator 21 is applied through an output resistor 30 to a summing junction which is connected to receive an output signal from the computer. This output signal is applied through a resistor 31 from output terminal 32 of the computer. The signal appearing at the junction is connected by a sampling switch 33 operated by the coil 17 to the input circuit of an amplifier 34. The coil 17 is also arranged to open switch 36 to prevent any change in the sampled signal during the period of sampling. The amplifier 34 is used as a storage means by having a feedback capacitor 35 which is effective to store the input signal supplied by amplifier 23 when switch 33 is closed. The output signal from the amplifier 34 is connected to the output terminal 32 for feedback to the summing junction, as described above.

In operation, the analog computing circuit of the present invention is effective to multiply the input signal applied to the second input terminal 12 by the signal on input terminal 20 and divide the product by the input signal on input terminal 1. This may be shown as follows: Assume the input signal on terminal 1 is Z, terminal 12 is X and terminal 20 is Y. The integration of Z by the first integrator 2 is effective to produce:

$$\int_0^t Z dt = Zt \qquad (1)$$

The summing junction 11 is effective to produce an output signal from amplifier 14 when the input $X=Zt$ or $$t=\frac{X}{Z} \qquad (2)$$

Meanwhile, integrator 21 is integrating Y to produce:

$$\int_0^t Y dt \cong Yt \text{ if } \frac{dy}{dt} \cong 0 \qquad (3)$$

during the time period allowed for integration.

When $X=Zt$, the relay coil 17 is operated by the signal differentiating action of capacitor 16 to close switch 33 and open switch 35 to initiate a sampling of Y*t*. This transfers the instantaneous value of Y*t* to the storage capacitor 35. The switch 33 is reopened and switch 35 is reclosed at the end of the sampling operation as a result of the termination of the differentiating action of capacitor 16 when it has charged to the magnitude of the output signal from amplifier 14. Thus, the sampling period is established by the charging rate of capacitor 16 and is advantageously arranged to match the storage rate of amplifier 34 and capacitor 35.

When the output signal from the integrator 2 reaches an amplitude sufficient to back-bias Zener diode 8, the relay coil 7 is energized. The activation of coil 7 is effective to close shorting switches 6 and 25 to discharge capacitors 5 and 24, respectively. This terminates the prior integrating operation in preparation for a new integration. The termination of the output signal of integrator 2 is effective to deenergize relay coil 7 and open switches 6 and 25 with the inductive lag of coil 7 being arranged to assure a complete discharge of capacitors 5 and 24. The storage capacitor 35, however, has stored the prior sampled magnitude of the output signal from integrator 21, which stored signal is applied to output terminal 32. This output signal is $Yt$ or, substituting $$t=\frac{X}{Z}$$

from Equation 2, so that:

$$Yt=\frac{YX}{Z} \quad (4)$$

It is to be noted that input Y can be of either sign to afford a two quadrant multiplication operation.

Figure 2:
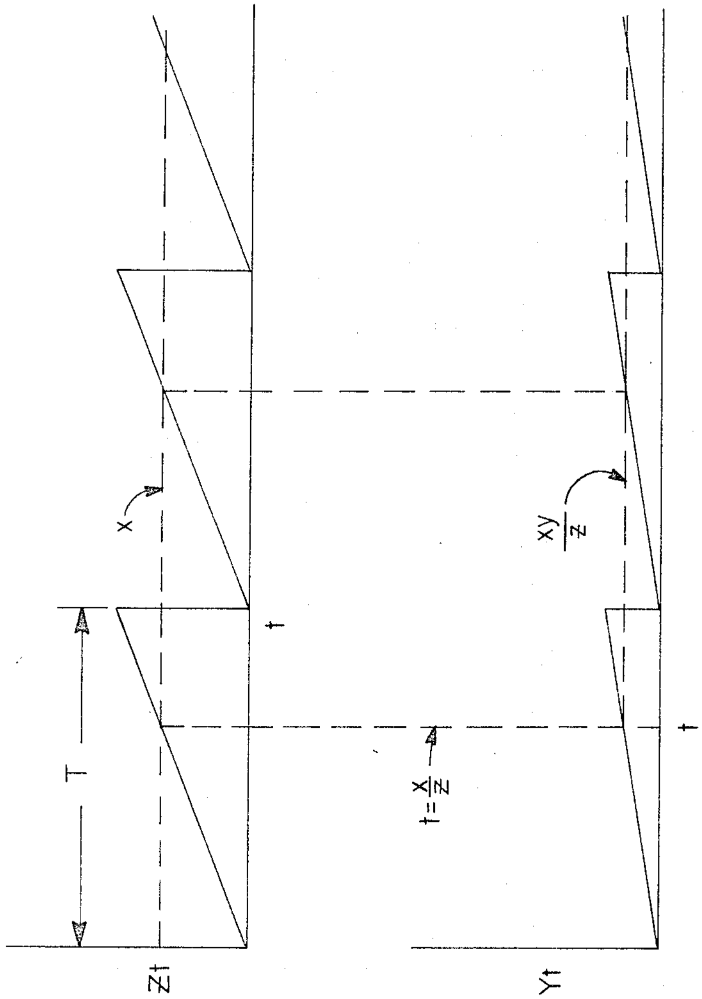
FIG. 2 is a pictorial showing of the signal waveforms occurring in the circuit shown in FIG. 1.

The waveshapes shown in FIG. 2 show the output signal from integrator 2 and integrator 21 with the vertical lines representing the operation of relay 17. The time of the integration cycle represented by interval T is determined by the breakdown voltage of Zener diode 8, which effects the operation of relay 7 at the end of each interval T to close switches 6 and 25.

The further operation of the present invention after time T is a repetition of the above operation which is effective to change the output signal on terminal 32 to follow any changes in the input variables.

The forward conduction of Zener diode 15 across amplifier 14 is effective to control the operation of relay coil 17 by holding the output of amplifier 14 at a zero level when the magnitude of X is greater than $Zt$. When X and $Zt$ are equal, the forward conduction of diode 15 is terminated, and the output signal of amplifier 14 rises to the breakdown level of diode 15, which level is sufficient to energize the coil 17.

Figure 3:
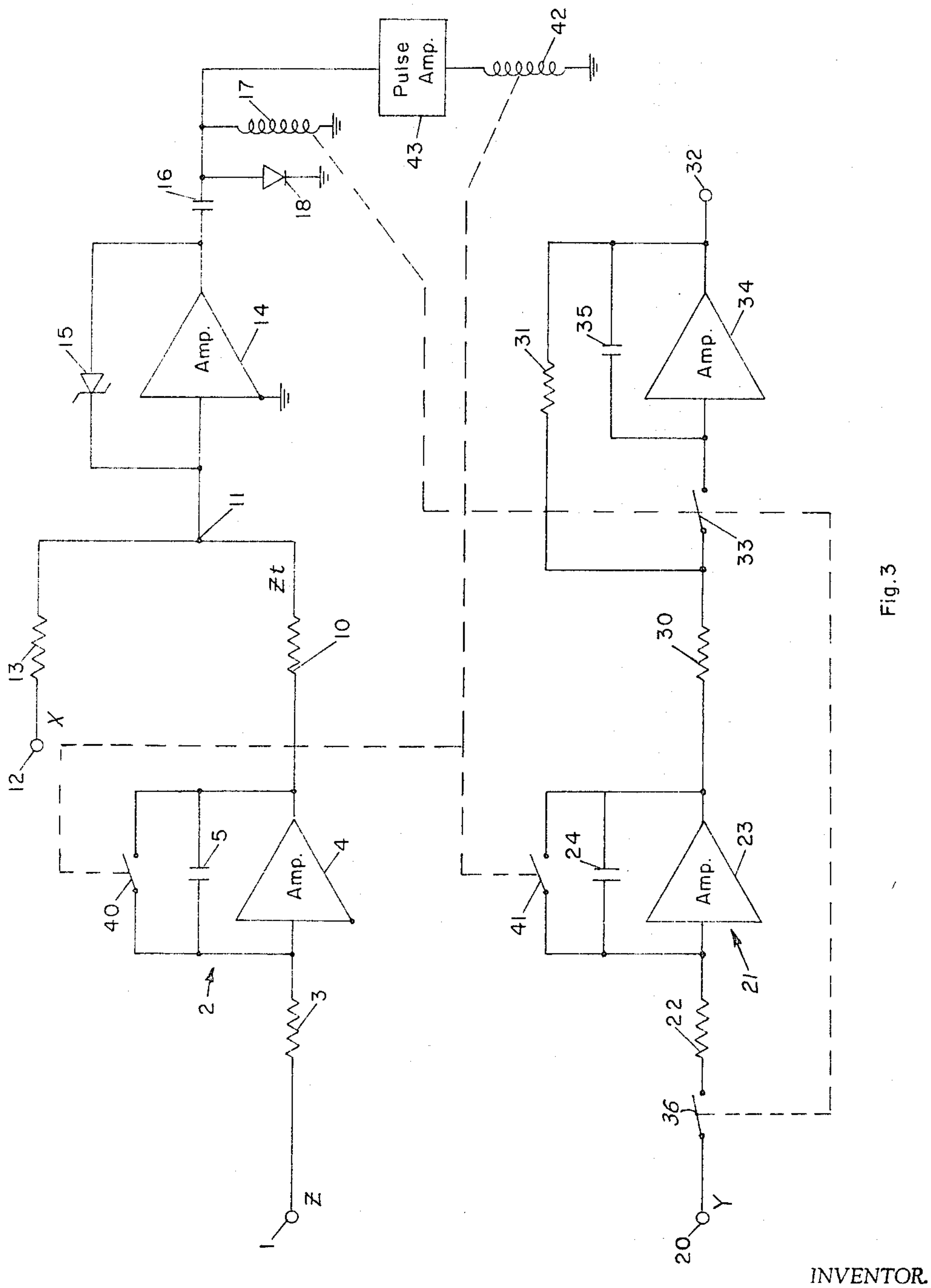
FIG. 3 is a modification of the embodiment of the invention shown in FIG. 1.

In FIG. 3, there is shown a modified embodiment of the present invention. Similar reference characters are used for the circuit elements which are identical with those of FIG. 1 and have a similar operation to that described above. The modification shown in FIG. 3 provides a reduction in the time required to operate on small magnitude signals by providing a variable overall cycle time determined by the occurrence of the operation of relay 17. In this form, a shorting switch 40 for the capacitor 5 and a shorting switch 41 for the capacitor 24 are arranged to be operated by a relay coil 42. The coil 42 is driven by a signal from a pulse amplifier 43 which is connected to the signal appearing across coil 17. The amplifier 43 is arranged to operate when the relay 17 is deenergized as previously discussed. Thus, the coil 42 is operated shortly after coil 17 is deenergized to initiate a new cycle by discharging capacitors 5 and 24. Accordingly, the cycle time of the circuit is arranged to respond to the magnitude of the input signals compared at junction 11 whereby low level signals are operated on without a waste of time in initiating a new cycle.

Accordingly, it may be seen that there has been provided, in accordance with the present invention, a two quadrant multiplier and divider apparatus for performing a simultaneous multiplying and dividing operation on analog input signals.

What is claimed is:

1. An analog multiplier and divider computing circuit comprising a first integrator, a second integrator, a first input signal terminal connected to an input circuit of said first integrator, a signal comparator for comparing two input signals and producing an output signal during the time of equality of the magnitudes of the compared signals, circuit means connecting an output signal from said first integrator as one input signal to be compared by said comparator, a second input terminal connected to said comparator as a source of a second signal to be compared, a third input terminal connected to an input circuit of said second integrator, signal sampling means arranged to selectively sample and store during the occurrence of a control signal the amplitude of an output signal from said second integrator, circuit means connecting said output signal from said comparator as a control signal from said sampling means, and an output terminal connected to an output circuit of said sampling means.

2. An analog multiplier and divider computing circuit as set forth in claim 1 wherein said first and second integrators each include means for resetting an integrator to an initial state after an integrating operation, and including operating means responsive to a predetermined magnitude of said output signal from said first integrator to operate said means for resetting following the operation of said sampling means.

3. An analog multiplier and divider computing circuit as set forth in claim 2 wherein said first and second integrators each include an integrating capacitor, said means for resetting includes a first and a second relay operated shorting switch connected across the integrating capacitor associated with each of said integrators, and said operating means comprises a Zener diode and a relay coil connected in series to the output circuit of said first integrator, said relay coil being arranged to operate said first and said second shorting switch.

4. An analog multiplier and divider computing circuit as set forth in claim 1 wherein said first and second integrators each include means for resetting an integrator in an initial state after an integrating operation, said means for resetting including means responsive to the termination of said control signal from said comparator means to operate said means for resetting following the operation of said sampling means.

5. An arithmetic circuit comprising, first and second integrating means, comparing means, storage means, first and second input means connected to said first and second integrating means respectively, third input means and the output of one of said integrating means connected to the input of said comparing means, said comparing means operative to produce an output control signal when the signals supplied thereto by said one integrating means and said third input means exhibit a predetermined relationship, and control means disposed between the output of the other integrating means and the input of said storage means and operative to establish a connection therebetween in response to a control signal from said comparing means.

6. The arithmetic circuit recited in claim 5 including switch means disposed between the input of said other integrating means and the associated input means, said switch means operative to interrupt a connection between said other integrating means and the associated input means in response to said control signal from said comparing means whereby said other integrating means discontinues integration while the output signal produced thereby is transferred to said storage means.

7. The arithmetic circuit recited in claim 5 wherein the input of said comparing means comprises a summing junction whereat the third input signal and the output of said one integrating means are algebraically summed.

References Cited

UNITED STATES PATENTS

| | | | |
|---|---|---|---|
| 3,017,106 | 1/1962 | Patterson | 235—195 X |
| 3,043,516 | 7/1962 | Abbott et al. | 235—195 |
| 3,161,766 | 12/1964 | Bates | 235—195 |
| 3,249,925 | 5/1966 | Single et al. | 235—183 X |

FOREIGN PATENTS

| | | |
|---|---|---|
| 914,721 | 1/1963 | Great Britain. |

MALCOLM A. MORRISON, *Primary Examiner.*

T. J. PAINTER, *Assistant Examiner.*